(12) United States Patent
Al-Khomairi (10) Patent No.: US 8,307,855 B2
(45) Date of Patent: Nov. 13, 2012

(54) FLUID PRESSURE SPIKE SUPPRESSION DEVICE

(75) Inventor: Abdulrahman Mohammad Al-Khomairi, Riyadh (SA)

(73) Assignee: King Saud University, Riyadh (SA)

( * ) Notice: Subject to any disclaimer, the term of this patent is extended or adjusted under 35 U.S.C. 154(b) by 562 days.

(21) Appl. No.: 12/498,922

(22) Filed: Jul. 7, 2009

(65) Prior Publication Data

US 2011/0005630 A1   Jan. 13, 2011

(51) Int. Cl.
*F16L 55/04* (2006.01)
(52) U.S. Cl. ............................................ 138/30; 138/26
(58) Field of Classification Search ............ 138/26, 138/30
See application file for complete search history.

(56) References Cited

U.S. PATENT DOCUMENTS

| | | | |
|---|---|---|---|
| 2,497,020 A | 2/1950 | Singer | |
| 2,707,033 A * | 4/1955 | Moerke et al. | 138/26 |
| 2,764,103 A * | 9/1956 | Mercier | 137/114 |
| 2,952,211 A * | 9/1960 | Saner | 417/383 |
| 2,968,318 A * | 1/1961 | Bauman | 138/26 |
| 3,126,032 A * | 3/1964 | Halter | 138/26 |
| 3,331,398 A * | 7/1967 | Goss | 138/26 |
| 3,532,125 A | 10/1970 | Everett et al. | |
| 3,669,150 A | 6/1972 | Everett | |
| 4,032,265 A * | 6/1977 | Miller | 417/540 |
| 4,367,786 A * | 1/1983 | Hafner et al. | 165/10 |
| 4,838,299 A * | 6/1989 | Behrens | 137/203 |
| 4,911,204 A | 3/1990 | Martin | |
| 6,076,557 A * | 6/2000 | Carney | 138/30 |
| 6,089,273 A * | 7/2000 | Cooper et al. | 138/30 |
| 6,390,132 B1 * | 5/2002 | Johnson et al. | 138/30 |
| 6,491,065 B1 | 12/2002 | Rogers | |
| 6,543,485 B2 | 4/2003 | Henry et al. | |
| 2002/0059959 A1 * | 5/2002 | Qatu et al. | 138/30 |

* cited by examiner

*Primary Examiner* — James Hook
(74) *Attorney, Agent, or Firm* — Hart IP Law and Strategies, LLC (57) ABSTRACT

Systems and apparatus for suppressing/controlling pressure spikes in a fluid pipe system are described. In one aspect, an apparatus for controlling pressure spikes in a fluid pipe system includes, for example, a fluid pressure spike suppression pipe ("damper pipe") portion with multiple openings for connecting to at least two network pipes in a fluid system pipe network. The damper pipe has a diameter that is larger than respective diameters of the network pipes within which fluid pressure spikes are to be suppressed. First and second openings for connecting to the network pipes are respectively positioned at proximal and distal ends of the damper pipe. The first opening in the damper pipe is for fluid ingress into the damper pipe via a first pipe network pipe. The second opening in the damper pipe is for fluid egress out of the damper pipe and into a second network pipe.

10 Claims, 5 Drawing Sheets

FLUID PRESSURE SPIKE SUPPRESSION DEVICE

BACKGROUND

Sudden opening or closure of a control valve, or tap, can cause a pressure surge or spike in plumbing as a result of forcing a fluid in motion (or, in some conditions, a gas) to stop or change direction suddenly. This phenomenon is called water or fluid hammer, and it can cause ruptures and leaks in pipes and fittings. Water hammer creates pressure waves that travel upstream and downstream of the closed/opened taps at nearly the speed of sound. There are a number of standard techniques that attempt to minimize the pressure spikes resulting from water hammer. In pipe networks, for example, common techniques to address water hammer include use of surge vessels, equilibrium tanks, pressure relief valves, and suction lines around the booster pump. In residential and light commercial/industrial applications, an air chamber and water hammer arrestor may be used for water hammer control.

Figure 1:
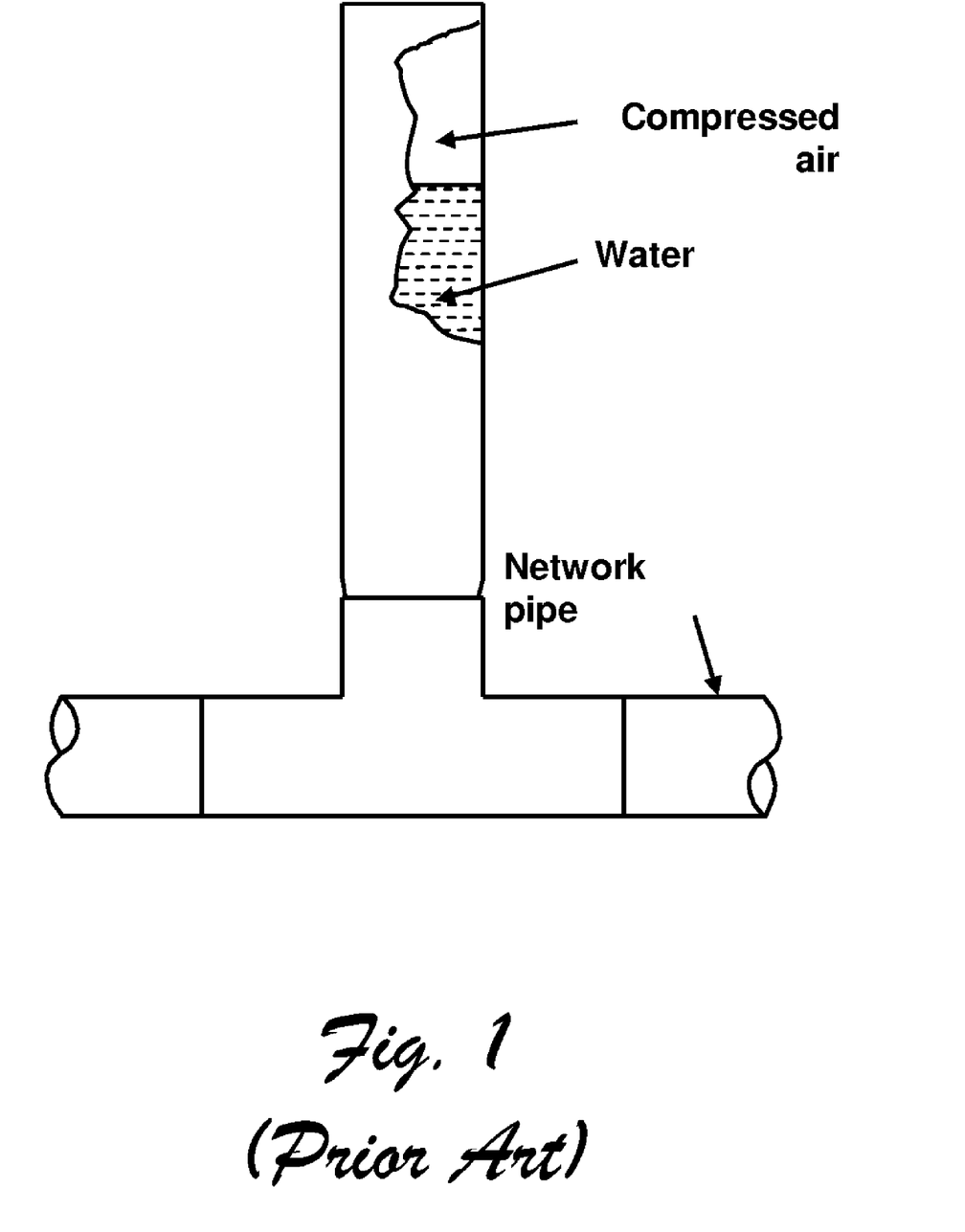
FIG. 1 shows a prior art pipe network that employs an air chamber to address undesirable pressure surges associated with water hammer.
Figure 2:
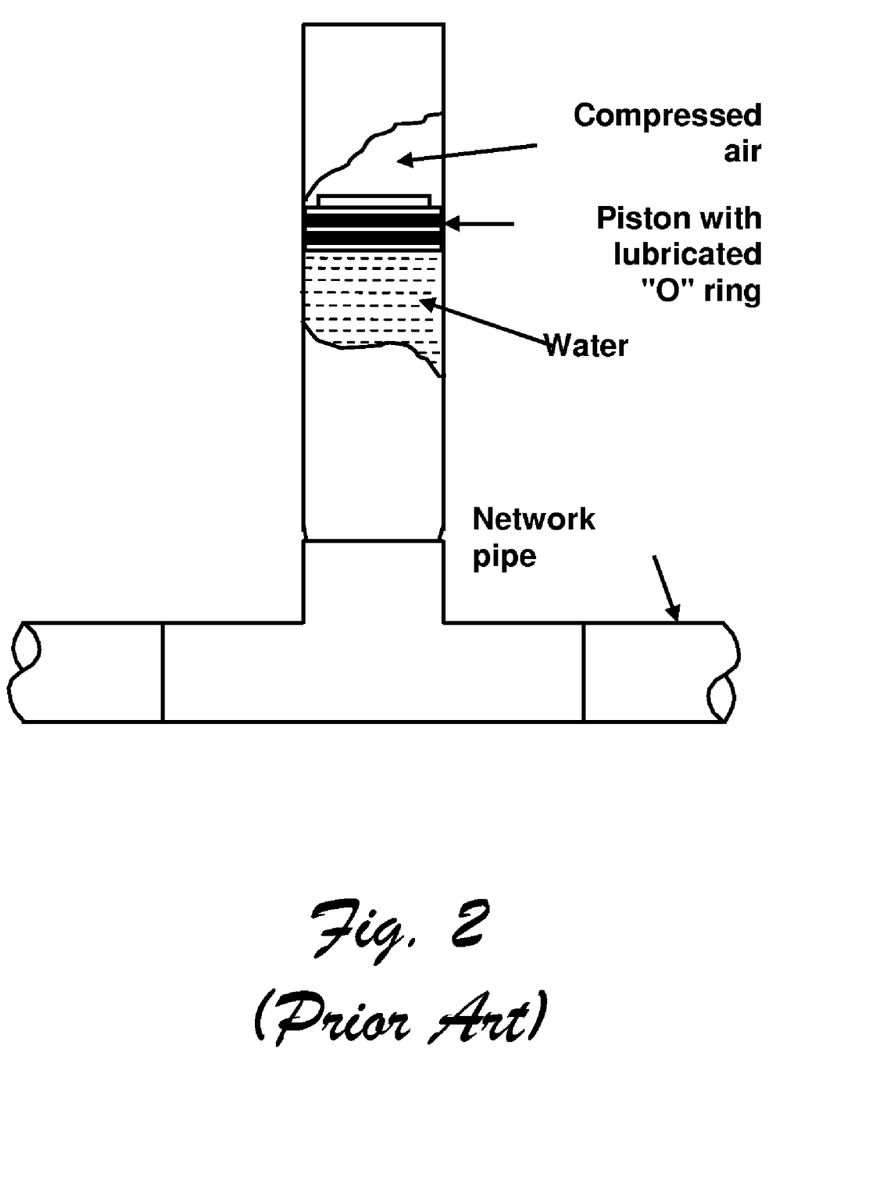
FIG. 2 shows a prior art water pipe network that employs an arrestor device to compensate for sudden water pressure surges associated with water hammer phenomena.

FIG. 1 shows a prior art pipe network that employs an air chamber to address undesirable pressure surges associated with water hammer. As shown in FIG. 1, this is a conventional technique wherein a short vertical section of pipe is filled with trapped air. In this scenario, when a valve is suddenly closed, the air chamber acts as a shock absorber. Air in this chamber compresses and cushions the resulting shock. The disadvantage of this conventional technique/device is that after time, the air pocket is eventually absorbed into/by the water, which renders the device ineffective. To remedy this limitation, one must drain water out of the system to recreate the air pocket. Referring to FIG. 2, a prior art arrestor device designed to address water hammer in a pipe network is shown. As shown in FIG. 2, this solution to water hammer is similar to that of the air chamber of FIG. 1, with the exception that the air pocket in the arrestor is separated and sealed from the water by a piston with an "O" ring or diaphragm so that the air cannot be absorbed by water. The air pocket for this type of water hammer control device is pressurized to a certain limit. One disadvantage of this "arrestor" technique/device is that the pressure level of the air pocket is typically too high for the device to work properly for low pressure applications. Another disadvantage of this device is that the moving piston generally makes it noisy. Furthermore, both the air chamber and water hammer arrestor devices have the disadvantage of being metallic (usually copper); thus, they are susceptible to corrosion and erosion.

SUMMARY

Systems and apparatus for suppressing/controlling pressure spikes in a fluid pipe system are described. In one aspect, an apparatus for controlling pressure spikes in a fluid pipe system includes, for example, a fluid pressure spike suppression pipe ("damper pipe") portion with multiple openings for connecting to at least two network pipes in a fluid system pipe network. The damper pipe has a diameter that is larger than respective diameters of the network pipes within which fluid pressure spikes are to be suppressed. First and second openings for connecting to the network pipes are respectively positioned at proximal and distal ends of the damper pipe. The first opening in the damper pipe is for fluid ingress into the damper pipe via a first pipe network pipe. The second opening in the damper pipe is for fluid egress out of the damper pipe and into a second network pipe.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5(a) through 5(d) show a set of exemplary data showing how a plastic embodiment of the fluid pressure spike suppression ("FPSS")/damper/control pipe of FIG. 3 performs as compared to a large commercial water hammer arrestor. Specifically:

DETAILED DESCRIPTION

An Exemplary Plastic Water Hammer Damper

Figure 3A:
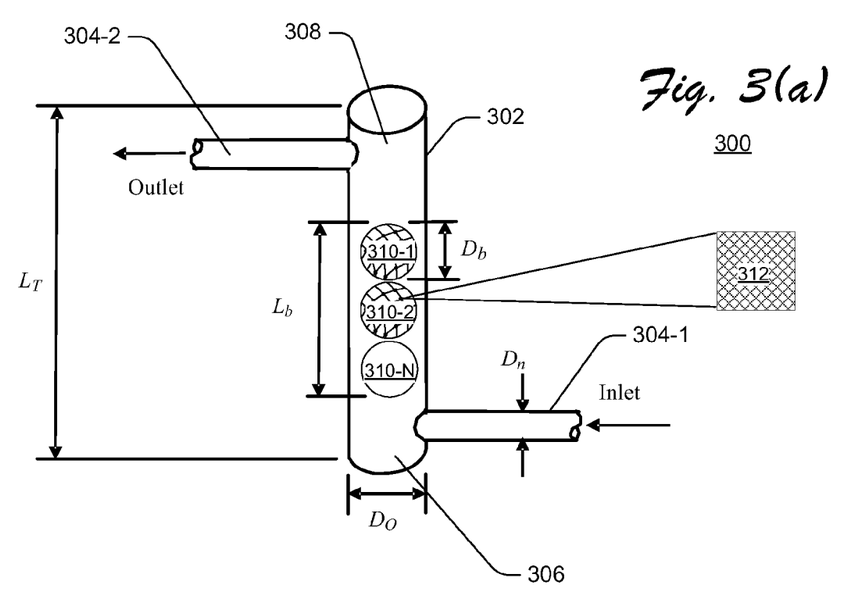
FIGS. 3(a) and 3(b) show exemplary embodiments of novel water/fluid pressure spike suppression pipe portions ("damper pipes") in respective pipe networks.
Figure 3B:
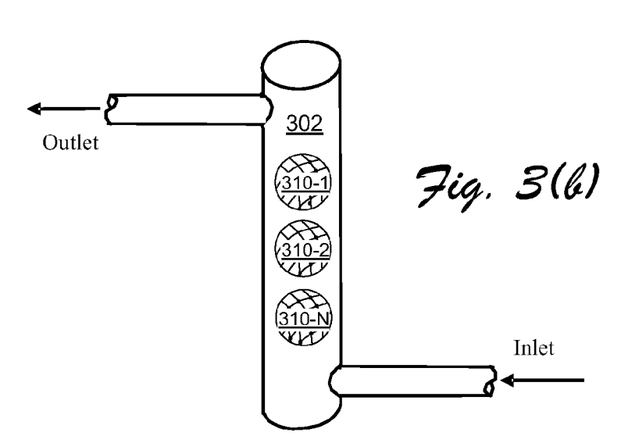

FIGS. 3(a) and (b), which are collectively referred to hereinafter as FIG. 3, show exemplary embodiments of a fluid pressure spike suppression ("FPSS")/damper ("FPSD")/control pipe 302. In this particular implementation, the novel FPSS device 302 is for suppressing fluid (e.g., water) hammer in residential and commercial fluid systems comprising plastic and/or metallic pipes—although, in another implementation, the concepts disclosed in this specification can also be used in gas systems, as compared to fluid systems, to dissipate sudden gas pressure spikes. In this implementation, the device comprises the FPSS pipe/vessel portion 302 (e.g., made from Polychloroethene or "uPVC" or "PVC"). FPSS 302, which is hereinafter often referred to as a "damper pipe," has a larger pipe diameter than the connecting pipes 304 (304-1 and 304-2) for which pressure spikes in fluids that typically result in water hammer are to be controlled/suppressed. To this end, and referring to either of FIG. 3(a) or 3(b), first and second network pipe portions 304-1 and 304-2 are operatively coupled to the damping pipe 302 in a substantially perpendicular orientation to the length of the damping pipe 302. Network pipe 304-1 serves for fluid ingress (an "inlet") to provide fluid flow into the damper pipe 302. Please note that as the fluid enters the damper pipe 302 from inlet pipe 304-1, the fluid is substantially perpendicularly redirected along the length of the damper pipe 302 for egress out the opposite end of the damper pipe 302 via network pipe 304-2 ("outlet"). Please note that in this exemplary implementation, the second portion is also perpendicular to the orientation of the damping pipe 302. This network pipe 304 orientation to the damping pipe, which results in fluid flow through the length of the damping pipe (ingress at a proximal end 306 and egress at a distal end 308) in normal fluid flow operation, as well as during operation to suppress a fluid pressure spike, serves to dampen any fluid pressure spike in a substantially optimal manner. In this particular implementation, fluid ingress or egress at location(s) other than a proximal or distal end (e.g., a centralized location with respect to the length of the damper pipe) of the damper pipe 302 will not as effectively mitigate fluid pressure surges in system 300.

Although the diameter of pipe 304-1 may be the same as the diameter of pipe 304-2, the diameter of a pipe 304 need not be the same and the diameter of a different pipe 304. Additionally, although pipe 304-1 is labeled as an "outlet" and pipe 304-2 is labeled as an "inlet," these labels illustrate but one exemplary embodiment of fluid flow direction. Different complementary inlet/outlet (fluid flow) configurations can be used for pipes 304 without departing from the scope of the described FPSS 302. Damper pipe 302 does not rely on use of any bladder or water permeable screen. Moreover, damper pipe 302 is always filled with fluid, meaning that it has different characteristics and does not operate as a conventional air or vacuum chamber to alleviate pressure spikes resulting from fluid hammer. As such, the mechanism (e.g., gas) used in mitigating fluid pressure spikes will not be absorbed over time by the fluid, as in the case of an air chamber.

Referring to FIG. 3(a) and TABLE 1, the following exemplary design parameters of TABLE 1 pertain to but one embodiment of many possible embodiments of the damper pipe 302. As such, these design parameters offer preliminary guidelines, but damper pipe 302 can work properly to dissipate pressure spikes resulting from water hammer conditions outside the parameters of TABLE 1.

TABLE 1

EXEMPLARY FPSS/FPSD PIPE DESIGN PARAMETERS $D_O > 4D_n$
$L_T \geq 4D_O$
wherein,
$D_O$ = damper pipe inside diameter;
$D_n$ = diameter of the network pipe for which water hammer is to be controlled; and
$L_T$ = total length for the damper pipe.

In this implementation, the damper pipe (pipe 302) diameter is large enough so as to expand easily under water pressure. This allows damper pipe 302 to swell in the radial direction; thus it would be able to store additional fluid resulting from fluid pressure spikes for a time period long enough to allow the pressure spike to travel to the boundary and to be reflected back with negative pressure spike, resulting in a reduction of pressure and relief to the main pipe(s) 304. Thus, the system 302 absorbs a fluid pressure spike to quickly restore normal pressure to network pipes 304.

Alternate Embodiments

Configurable Balance between Pressure Spike Suppression Materials and Various Operating Pressure Environments In one implementation, for example, and to enhance the performance of the device 302, a number of air-filled balloon(s) 310 (e.g., balloons 310-1 through 310-N) of spherical shape are inserted into the damper pipe 302. Each balloon 310 is comprised of a non-porous plastic or rubber material (not a cellular foam or foam-like material) that is inflated with gas (e.g., air or other gas). Since the gas inside each of the one or more balloons 310 is highly elastic, the balloon(s) will shrink when subjected to fluid pressure surge(s) during water hammer occurrence and expand when fluid pressure is reduced. Because the non-porous balloons 310 are not foam, the gas in the balloons will not be absorbed by the substantially continuous presence of liquid in the chamber 302, wherein the presence is independent of fluid pressure spike(s).

In this embodiment, a balloon 310 is inflated with gas (e.g., air) to a select target and configurable pressure that is based on characteristics of the selected balloon material and the operating pressure of the pipe network 300. In one implementation, for example, the gas pressure inside these balloon(s) is greater than local atmospheric pressure (absolute) but less than the normal water pressure just upstream of a control valve (e.g., control valve 404 of FIG. 4) plus the additional expected pressure spike (if no water hammer control is used). Low gas pressure inside the balloons may be suited to low pressure applications. High gas pressure inside the balloons may be suited for high pressure applications and applications where there may be high fluid pressure spikes, including systems that typically operate at low pressures. At the limit, when the gas pressure inside the balloon is equal to the pipe network normal pressure plus the expected pressure spike, the balloon itself will not shrink. For this reason, the gas pressure inside the balloons is selected so that it is not low enough to be reduced significantly during normal operational conditions and not high enough to reach levels beyond the maximum pressure levels recommended for the pipe(s).

The following exemplary design parameters shown in TABLE 2 pertain to but one embodiment of the possible alternate embodiments of the FPSS/FPSD device 302 (please see FIG. 3(a)) comprising one or more balloons 310 or balloon-like devices, which are referred to collectively as "balloon(s)." As such, these design parameters offer preliminary guidelines, but this alternative embodiment of the damper pipe 302 can work properly to dissipate pressure spikes resulting from water hammer conditions outside these parameters.

TABLE 2

EXEMPLARY FPSS/FPSD PIPE BALLOON DESIGN PARAMETERS $L_b < 0.8 L_T$
$D_b \leq 0.9 D_O$
$P_{atm} \leq P_b \leq P_n + N$
wherein,
$D_b$ = Balloon diameter,
$L_b$ = Summation of balloon diameters,
$P_{atm}$ = Local atmospheric pressure (absolute),
$P_b$ = Air pressure inside balloon (absolute),
$P_n$ = Normal network pressure just upstream of control (absolute), and
N = Pressure increase at the location of the damper due to the spike from water hammer if no pressure spike suppression device is used. The magnitude of this variable is obtained by subtracting the normal pressure before spike from the maximum pressure level after pressure spike due to fluid transient.

In one implementation, and because different materials have corresponding elastic or tensile strength properties, respective ones of the balloon(s) 310 are comprised of material that is particularly selected to correspond to target in-balloon gas pressure level(s) to respectively allow or to constrain volume contraction or expansion of the respective balloons. This provides for the balloon material(s) to be selectively matched with target internal gas pressures when configuring the design of the damper device 302 for a particular fluid network application (e.g., high, low, and/or medium pressure application(s)).

Retaining Mesh to Encapsulate Balloon in High Pressure Operations

In one embodiment, and as shown in FIGS. 3(a) and 3(b), one or more balloons 310 is/are encapsulated in a retaining mesh 312. Such a retaining mesh 312 is shown as a matrix of intersecting lines on a balloon 310. A balloon 310 without the retaining mesh 312 is shown as balloon 310-N in FIG. 3(b)). The retaining mesh 312 maintains a fixed balloon volume even when the gas pressure that has been configured inside the balloon would otherwise expand the balloon's diameter (i.e., if the mesh were not there to constrain such expansion). This is in contrast to conventional water hammer suppression systems, wherein pressure in such conventional systems may be limited to a maximum, which is when the balloon diameter is equal to the inner diameter of the water hammer suppression chamber.

In one embodiment, the retaining mesh 312 comprises wire and/or other non-elastic material. A balloon 310 encapsulated in a retaining mesh is hereinafter often referred to as a "caged balloon." The mesh 312 is constructed such that it has holes between respective portions of the mesh, wherein each hole allows a configurable portion of fluid pressure in the FPSS chamber 302 to influence a configurable portion of the surface of the balloon for corresponding contraction of the balloon in desired circumstances (e.g., fluid pressure spikes of configurable magnitude). In one implementation, the size of the holes in the encapsulating mesh is configured based on one or more of: (a) elastic and/or tensile characteristics of the balloon material; (b) normal operating pressure of the pipe network that includes the FPSS device 302; and (c) internal pressure of the gas inside the balloon. One exemplary use of one or more caged balloons is in a fluid pipe network that operates normally at high pressure and wherein corresponding fluid pressure spikes will be high pressure. In this scenario, and to suppress fluid hammer in such a system, the gas pressure inside the balloon(s) 310 is increased to accommodate for corresponding fluid pressure spikes in the system.

In one implementation, low gas pressure in the balloons 310 is used to suppress fluid hammer in a low pressure system. In this scenario, one or more caged balloons 310 may or may not be used, as desired, in the same suppression chamber 302 to address a range of system conditions. For example, in one implementation, a combination of non-caged balloons 310 and caged balloons 310 are used in a damper pipe 302 that is targeted/installed for/in a low pressure system to address any occurrence of a high pressure fluid pressure spike in the system. In another example, caged balloons and balloons without cages could be used in the same chamber 302 so that the caged balloons take care of positive pressure spikes (pressure increases) and balloons without cages take care of low pressure spikes (negative pressures) by expanding according to Boyle's law.

The described implementations of system 300, wherein a retaining mesh 312 is used to constrain expansion of a balloon 310, are in contrast to conventional water hammer suppression devices that may not be useful; for example, to address water hammer in high and/or low pressure systems. This is because, in such standard systems, pressurizing a balloon may cause corresponding balloon volume expansion, and de-pressurizing a balloon may cause corresponding balloon volume collapse. For instance, a conventional system for water hammer suppression may prescribe use of crushable plastic foam (or cellular plastic) in a pressure vessel to address negative effects of water hammer. Cellular foam is generally considered to be a substance formed by trapping many gas bubbles in a liquid or solid. In such a standard system: (a) the inside pressure of bubbles in cellular foam or other container is generally limited; (b) elasticity of the foam and its response to loading and unloading conditions is generally too poor/limited to handle surge pressures in pipelines; (c) air bubbles in the foam will likely dissipate over time responsive to water hammer shock (or otherwise be absorbed into the fluid in the system); and (d) a prohibitively large volume of foam may be required to provide a desired air (bubble) volume.

Figure 4:
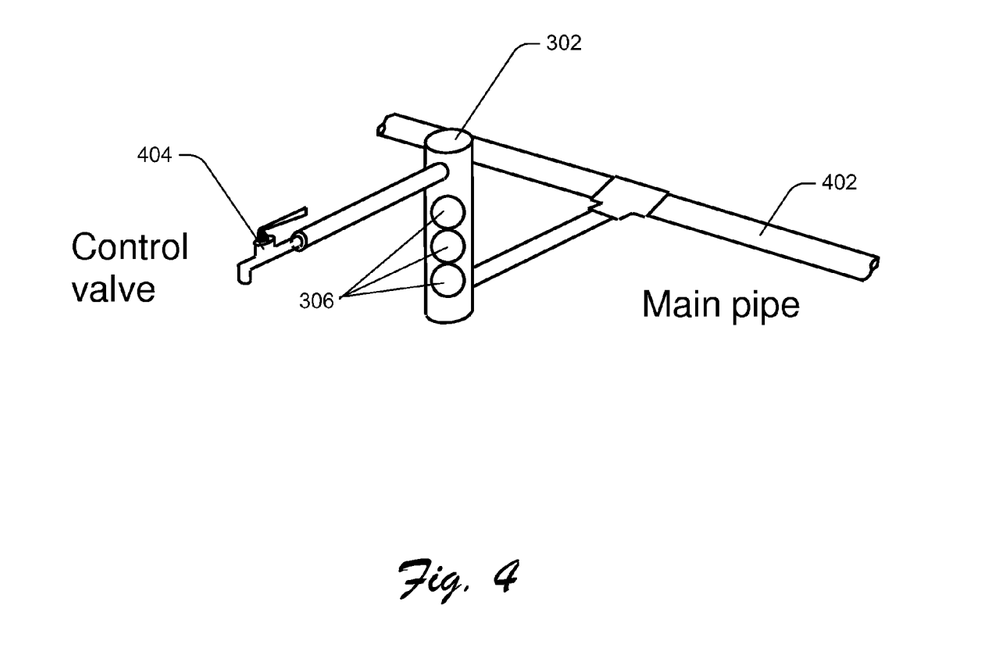
FIG. 4 shows a pipe network that includes a novel fluid hammer damper pipe (e.g., a "fluid pressure spike damper pipe") with balloons installed in a typical residential or commercial plumbing network comprising a main pipe and a control valve, according to one embodiment.

FIG. 4 shows an exemplary FPSS/FPSD device 302 with balloons 310 installed in a typical residential or commercial plumbing network comprising a main pipe 402 and a control valve 404, according to one embodiment.

Plastic Water Hammer Damper

In one implementation, damper pipe 302 is made of plastic. In this implementation, there are no corrosion/erosion problems that occur for metallic dampers/arrestors. Since there are no moving parts in this particular implementation of damper pipe 302, the device will not result in noise or bangs, as compared to the noise generally associated with a conventional water hammer arrestor.

Exemplary Performance

An exemplary set of parameters that effect the following are described: (a) pressure spike suppression when using a plastic chamber without balloons; and (b) pressure spike suppression when using air-filled balloons inserted in a steel chamber. As described, steel chamber response to pressure spike is negligible. Isolating the effect of chamber enables quantifying the effect of the balloons only.

Plastic Pressure Spike Damper (Plastic Chamber Without Balloons)

The parameters that affect the performance of this device are pipe diameter (D), pipe length (L), fluid velocity or discharge (Q), Young's modulus of elasticity for the damper material ($E_D$), damper length ($L_D$), damper diameter ($D_D$), damper wall thickness ($e_D$), pressure spike in pipe network due to water hammer (when no pressure surge control device is used) (N), fluid modulus of elasticity (K), Young's modulus of elasticity for the pipe (E), and pipe wall thickness (e). The following equations relate the reduction of pressure spike by the spike suppression device as a function of these parameters:

$$R = \frac{\Delta V_D}{\Delta V_{D-max}} = \frac{\left(N\pi D_D^3 \frac{L_D}{4e_D E_D}\right)\sqrt{1 + \frac{KD}{Ee}}}{2840QL} \quad (1)$$

$$\frac{\Delta p_{wo} - \Delta p_w}{\Delta p_w} = f(R) \quad (2)$$

wherein $\Delta V_D$ is the extra volume available due to damper pipe expansion from pressure spike, $\Delta V_{D\text{-}max}$ is the fluid volume admitted for complete water hammer elimination and is equal to the volume of fluid that enters the pipe in a time equal to $2Q/a$, $\Delta p_{wo}$ is the pressure spike in the pipe when no damping device is used, and $\Delta p_w$ is the pressure spike in the pipe when the spike suppression device is used.

Using different values for all the above parameters, more than 80 points were investigated. The left hand side of Eq. 2 is multiplied by 100 and plotted against the right hand side of Eq. 2 as shown in TABLE 3. If one knows the different parameters on the right-hand side of Eq. 2, that means the R value is known and it is possible to estimate the expected reduction; or, if there is a target reduction of pressure spike, one could enter the graph and obtain R from which it is possible to decide about which parameters values could be used to result in the desired R value:

TABLE 3

Air-Filled Balloons Inserted in a Steel Chamber

The parameters that affect the performance of the pressure spike suppression device are: local atmospheric pressure ($p_{atm}$), gas pressure inside the balloon ($p_b$), pipe pressure during normal system operation ($p_{p1}$), maximum pressure spike in the pipe if no spike control device is used ($p_{p2}$), pipe length (L), fluid modulus of elasticity (K), pipe diameter (D), Young's modulus of elasticity for the pipe (E), pipe wall thickness (e), discharge in the pipe (Q), caged balloon volume ($V_0$), and balloon initial pressure (the pressure necessary to inflate the balloon until it just starts pressing the cage) ($p_0$). The equations analogous to Eqs. (1) and (2) above are:

$$R = \frac{\Delta V_D}{\Delta V_{D\text{-}max}} \quad (3)$$

$$= \left( \frac{(p_{atm} + p_b - p_0)V_0\left(\frac{1}{p_{p2} + p_{atm}} - \frac{1}{p_{p1} + p_{atm}}\right)\sqrt{1 + \frac{KD}{Ee}}}{2840QL} \right)$$

$$\frac{\Delta p_{wo} - \Delta p_w}{\Delta p_w} = f(R) \quad (4)$$

Ten tests were carried out with a range of values for all the parameters mentioned above. The left-hand side of Eq. 4 is multiplied by 100 and plotted against the right-hand side of Eq. 3 to obtain FIG. 4. With all the values of the pipe and balloon parameters known, one could estimate the reduction in pressure spike from TABLE 4; or if it is desired to have a given target reduction, one could enter the curve from the reduction % axis and read the value of the volume ratio. When this value is used in Eq. 3, one could decide which parameters take which values to reach this value of volume ratio, as shown in TABLE 4:

TABLE 4

An Exemplary Plastic Water Hammer Damper with Balloons

One could use balloons inside a plastic chamber to obtain the performance of the device as indicated; for example, in TABLES 3 and 4. For instance, if the desired spike reduction is 80%, one could use 70% of this value for the balloons and the remaining 30% would be for the plastic chamber to absorb. These are target reductions.

Figure 5A:
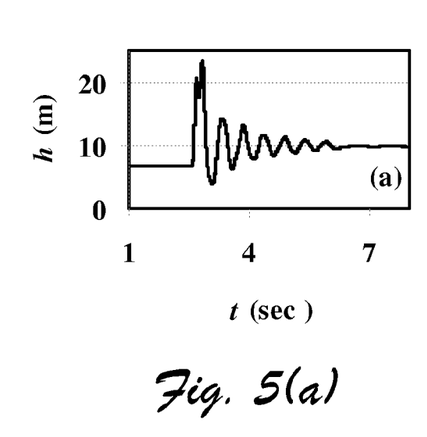
FIG. 5(a) shows water hammer results following valve closure in the test environment without using FPSS pipe device 302.
Figure 5B:
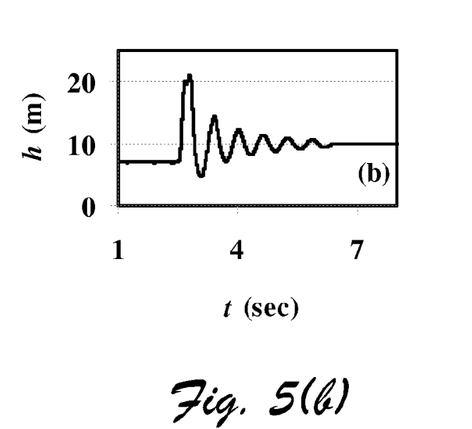
FIG. 5(b) shows water hammer results following valve closure in the test environment using a standard prior art large water hammer arrestor.
Figure 5C:
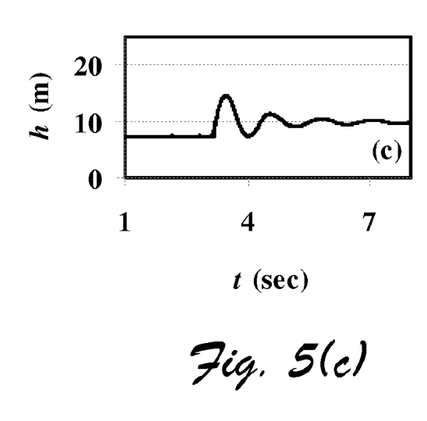
FIG. 5(c) shows exemplary water hammer results following valve closure in the test environment using a plastic embodiment of the FPSS pipe 302 of this disclosure without compressible inserts (e.g., balloons filled with air/gas), according to one embodiment.
Figure 5D:
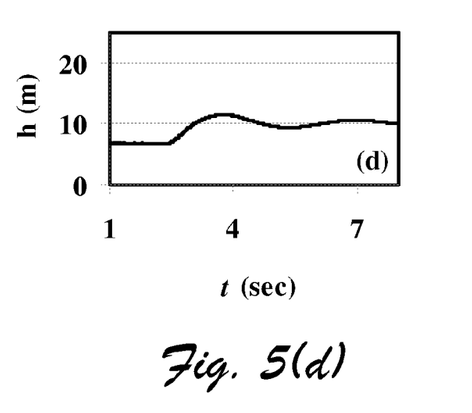
FIG. 5(d) shows exemplary water hammer results following valve closure in the test environment using a FPSS pipe 302 with three balloon inserts 306 encapsulating air at a pressure equal to the normal pressure in the fluid pipe network, according to one embodiment.

FIGS. 5(a) through 5(d) show a set of exemplary data to compare exemplary performance of the disclosed plastic water hammer damper 302 with performance of a large commercial water hammer arrestor in a substantially similar plumbing network. For purposes of exemplary comparison, a test, the information and results of which are shown in respective ones of FIGS. 5(a) through 5(d), was carried out in the ground floor of a residential building with an elevated storage tank that supplies water to the building by gravity. In this example, the elevation difference between the control valve and the water level in the elevated storage tank was about 10-12 m. The water hammer damper 302 for this test was having a damper pipe diameter of 101.6 mm and damper pipe length of 750 mm. FIG. 5(a) shows water hammer results following valve closure in the test environment without using damper pipe device 302. FIG. 5(b) shows water hammer results following valve closure in the test environment using a commercially available large water hammer arrestor. FIG. 5(c) shows exemplary water hammer results following valve closure in the test environment using the plastic water hammer damper 302 of this configuration without balloons 310, according to one embodiment. FIG. 5(d) shows exemplary water hammer results following valve closure in the test environment using a FPSS 302 with three balloons 310 with pressure equal to the normal pressure in the network, according to one embodiment. As shown, in FIGS. 5(a) through 5(d), the FPSS 302 provides substantially better reduction of water hammer pressure than the commercial water hammer arrestor (please see FIG. 5(b)). Additionally, use of the FPSS 302 with a set of balloons 310 substantially enhances performance of the device 302 to address fluid pressure surges responsive to the water hammer. Please note that fluid pressures responsive to the water hammer were further reduced as the number of balloons 310 used in the device 302 is increased.

Although the above sections describe systems and methods for a FPSS 302 in language specific to structural features and/or methodological operations or actions, the implementations defined in the appended claims are not necessarily limited to the specific features or actions described. Rather, the specific features and operations for the FPSS 302 are disclosed as exemplary forms of implementing the claimed subject matter.

The invention claimed is:

1. An apparatus for suppressing a pressure spike in a fluid system, the apparatus comprising:
a fluid pressure spike suppression ("FPSS") pipe having a plurality of openings for coupling with a plurality of network pipes in a fluid system, the FPSS pipe comprising a set of gas-filled balloons that are flexible under fluid pressure spikes pressure N, the FPSS pipe having a diameter that is larger than the network pipes within which fluid pressure spikes are to be suppressed, first and second openings of the openings being respectively positioned substantially perpendicular to the FPSS pipe at proximal and distal ends of the FPSS pipe, the first opening for fluid ingress into the FPSS pipe by a first pipe of the network pipes, the second opening for fluid egress from the FPSS pipe via a second pipe of the network pipes, wherein the fluid system carries gas, liquid, or the combination of gas and liquid;
wherein one or more of the gas-filled balloons are encapsulated in a retaining mesh, the mesh constraining expansion of the one or more balloons from pressure of gas inside respective ones of the one or more balloons, the retaining mesh allowing for change in the ball pressure without having a volume change and allowing for multiple balls with different pressure levels inside each of them to handle transient pressure event(s).

2. The apparatus of claim 1, wherein the FPSS pipe is plastic.

3. The apparatus of claim 1, wherein the FPSS pipe is metal.

4. The apparatus of claim 1, wherein $D_O$ is an inside diameter of the FPSS pipe, $D_n$, is a diameter of a network pipe of the network pipes, $L_T$ is a total length of the FPSS pipe, and $P_n$ is a normal main trunk line fluid pressure upstream and proximal to a control valve, and wherein $$D_O > 4D_n$$

$$L_T \geq 4D_O.$$

5. The apparatus of claim 1, wherein the FPSS pipe further comprises a set of gas-filled balloons that are flexible under fluid pressure spikes pressure N, and wherein $D_O$ is an inside diameter of the FPSS pipe, $D_n$, is a diameter of a network pipe of the network pipes, $L_T$ is a total length of the FPSS pipe, $P_n$ is a normal main trunk line fluid pressure (absolute) upstream and proximal to a control valve, $D_b$ is a diameter of each of the gas-filled balloons, $L_b$ is a summation of balloon diameters, N is a pressure spike due to water hammer if no pressure spike suppresser is used, and $P_b$ is gas pressure inside each balloon (absolute), and wherein $$D_O > 4D_n$$

$$L_T \geq 4D_O$$

$$L_b < 0.8L_T$$

$$D_b \leq 0.9D_O$$

$$P_{atm} \leq P_b \leq P_n + N.$$

6. A fluid pipe system comprising:
a trunk line for carrying liquid, gas, or the combination of gas and liquid;
a fluid pressure spike damping ("FPSD") pipe for mitigating fluid pressure spikes in the fluid pipe system, the FPSD pipe comprising a set of gas-filled balloons that are flexible under fluid pressure spikes pressure N, the FPSD pipe being operatively coupled via two (2) openings to respective ones of first and second network pipes of the main trunk line, the FPSD pipe having a diameter that is larger than the first and second network pipes, the first and second network pipes being respectively coupled via respective ones of the first and second openings at proximal and distal ends of the FPSD pipe, the first network pipe for fluid ingress into the FPSD pipe at an orientation that is substantially perpendicular to a length dimension of the FPSD pipe, the second network pipe for fluid egress from the FPSD pipe into the FPSD pipe at an orientation that is substantially perpendicular to the length dimension, the length dimension being two or more multiples of an inside diameter of the FPSD pipe;
wherein one or more of the gas-filled balloons are encapsulated in a retaining mesh, the mesh constraining expansion of the one or more balloons from pressure of gas inside respective ones of the one or more balloons, the retaining mesh allowing for change in the ball pressure without having a volume change and allowing for multiple balls with different pressure levels inside each of them to handle transient pressure event(s).

7. The fluid pipe system of claim 6, wherein the FPSD pipe is plastic.

8. The fluid pipe system of claim 6, wherein the FPSD pipe is metal.

9. The fluid pipe system of claim 6, wherein $D_O$ is an inside diameter of the FPSD pipe, $D_n$, is a diameter of a network pipe of the network pipes, $L_T$ is a total length of the FPSD pipe, and $P_n$ is a normal main trunk line fluid pressure (absolute) upstream and proximal to a control valve, and wherein $$D_O > 4D_n$$

$$L_T \geq 4D_O.$$

10. The fluid pipe system of claim 6, wherein the FPSD pipe further comprises a set of gas-filled balloons that are flexible under fluid pressure spikes pressure N, and wherein $D_O$ is an inside diameter of the FPSD pipe, $D_n$ is a diameter of a network pipe of the network pipes, $L_T$ is a total length of the FPSD pipe, $P_n$ is a normal main trunk line fluid pressure (absolute) upstream and proximal to a control valve, $D_b$ is a diameter of each of the gas-filled balloons, $L_b$ is a summation of balloon diameters, N is a pressure spike due to water hammer if no pressure spike suppresser is used, and $P_b$ is gas pressure inside each balloon (absolute), and wherein $$D_O > 4D_n$$

$$L_T \geq 4D_O$$

$$L_b < 0.8L_T$$

$$D_b \leq 0.9D_O$$

$$P_{atm} \leq P_b \leq P_n + N.$$

* * * * *